(12) United States Patent
Mellen

(10) Patent No.: US 11,524,814 B2
(45) Date of Patent: Dec. 13, 2022

(54) ERGONOMIC INTEGRAL HANDLE ASSEMBLY

(71) Applicant: Integrated Plastics Pty Limited, Villawood (AU)

(72) Inventor: Nick Mellen, Villawood (AU)

(73) Assignee: INTEGRATED PLASTICS PTY LIMITED, Villawood (AU)

( * ) Notice: Subject to any disclaimer, the term of this patent is extended or adjusted under 35 U.S.C. 154(b) by 1045 days.

(21) Appl. No.: 16/090,876

(22) PCT Filed: Apr. 4, 2017

(86) PCT No.: PCT/AU2017/000082
§ 371 (c)(1),
(2) Date: Oct. 3, 2018

(87) PCT Pub. No.: WO2017/173477
PCT Pub. Date: Oct. 12, 2017

(65) Prior Publication Data
US 2020/0324937 A1    Oct. 15, 2020

(30) Foreign Application Priority Data

Apr. 4, 2016 (AU) ................................ 2016901243

(51) Int. Cl.
*B65D 23/10* (2006.01)
*B29C 49/02* (2006.01)
(Continued)

(52) U.S. Cl.
CPC .............. *B65D 23/10* (2013.01); *B29C 49/02* (2013.01); *B29C 49/28* (2013.01);
(Continued)

(58) Field of Classification Search
CPC . B29C 49/28; B29C 49/4205; B29C 49/6418; B29C 49/421; B29C 49/02;
(Continued)

(56) References Cited

U.S. PATENT DOCUMENTS 5,086,937 A      2/1992  Robinson
8,524,143 B2 *   9/2013  Thibodeau .......... B29C 49/0073
                                                    264/532
(Continued)

FOREIGN PATENT DOCUMENTS

CN         1166151 A      11/1997
CN       101437665 A       5/2009
(Continued)

OTHER PUBLICATIONS

English translation of Office Action dated Aug. 24, 2021 issued by China for Application No. CN 202010552424.4.
(Continued)

*Primary Examiner* — Monica A Huson
(74) *Attorney, Agent, or Firm* — Ladas & Parry LLP

(57) ABSTRACT

A method of controlling a preform for stretch blow-moulding a container with an integrally formed handle; the preform comprising a body portion and the integrally formed handle; the preform transferred from a preform supply source to a blow moulding die for blowing the container; the method including the steps of passing the preform through a preform handle orientating apparatus, transferring the preform to a preform transportation system, maintaining orientation of the preform handle imposed by the preform handle orientating apparatus during transfer to the preform transportation system and transfer to the blow moulding die, rotating the preforms during transport along the transportation system past an array of preform heating elements while shielding the integrally formed handle from excessive expo- (Continued)

sure to the heating elements, transferring the preform from the transportation system to the blow moulding die, and wherein the handle comprises a loop of orientable material extending between an upper connection region and a lower connection region on the body portion of the preform; characterised in that the handle has a generally uniform cross section from proximate the lower connection region to a gradually widening cross section approaching the upper connection region; the cross section reaching and maintaining a maximum width proximate the upper connection region.

9 Claims, 9 Drawing Sheets

(51) Int. Cl.
*B29C 49/28* (2006.01)
*B29C 49/64* (2006.01)
*B29C 49/42* (2006.01)
*B29L 31/00* (2006.01)

(52) U.S. Cl.
CPC .... *B29C 49/42069* (2022.05); *B29C 49/6418* (2013.01); *B29C 49/42057* (2022.05); *B29C 49/42119* (2022.05); *B29C 2049/024* (2013.01); *B29C 2949/0791* (2022.05); *B29C 2949/0798* (2022.05); *B29L 2031/7158* (2013.01)

(58) Field of Classification Search
CPC .... B29C 2049/4226; B29C 2049/4231; B29C 2049/024; B65D 23/10; B29B 2911/14513; B29B 2911/1456; B29L 2031/7158
See application file for complete search history.

(56) References Cited

U.S. PATENT DOCUMENTS

2009/0243161 A1 10/2009 Beale
2015/0044620 A1 2/2015 Beale

FOREIGN PATENT DOCUMENTS

| CN | 204979572 U | 1/2016 |
| GB | 2464857 A | 5/2010 |
| JP | H04215945 A | 8/1992 |
| JP | 2009040445 A | 2/2009 |
| JP | 2010-274967 A | 12/2010 |
| WO | 96/30189 A1 | 10/1996 |
| WO | 2007/101309 | 9/2007 |

OTHER PUBLICATIONS

Chinese Office Action dated Oct. 9, 2019 for Application No. CN 201780034392.5.
International Search Report (ISR) for International Application No. PCT/AU2017/000082.
Written Opinion (WO) for International Application No. PCT/AU2017/000082 dated Aug. 15, 2017.
JP 2010-274967 A _ English_Abstract.
CN 204979572 U _ English_Abstract.
Written Opinion dated Jan. 5, 2021 issued by Singapore for Application No. SG 11201808658R.
Office Action with an English translation dated Jul. 24, 2021 issued by India for Application No. IN 201847041093.
Office Action dated Aug. 24, 2021 issued by China for Application No. CN 202010552424.4.
Supplementary Partial European Search Report dated Dec. 13, 2019 for Application No. EP 17778461.8.

* cited by examiner

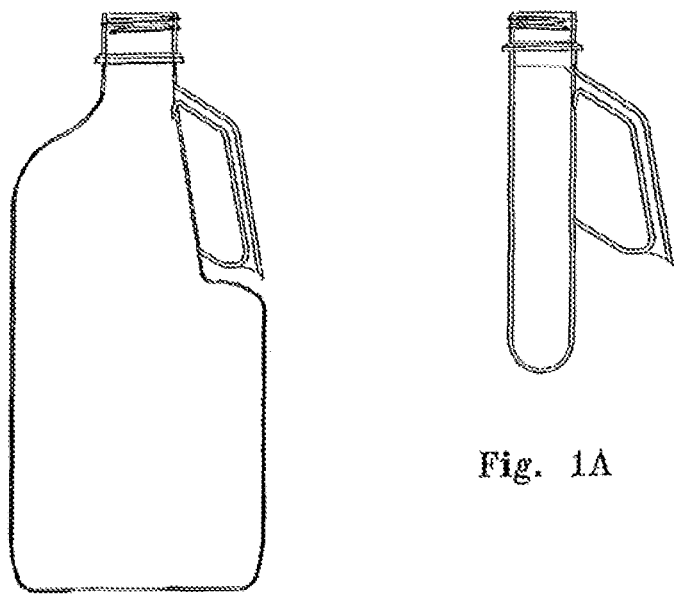
Fig. 1A
Fig. 1
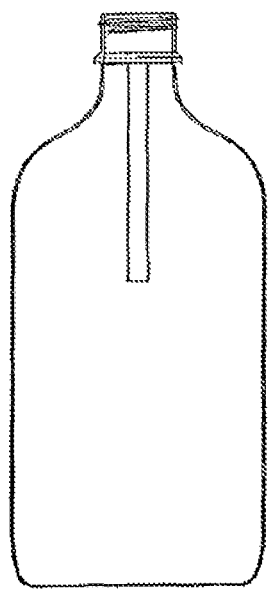
Fig. 1B  PRIOR ART

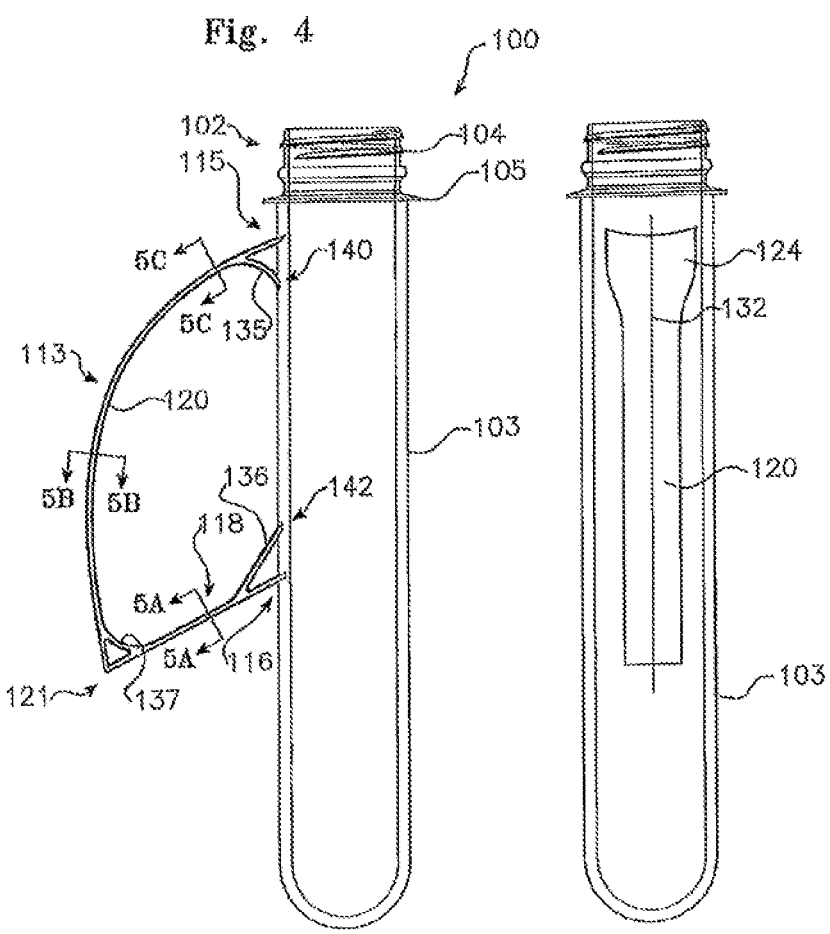

ERGONOMIC INTEGRAL HANDLE ASSEMBLY

RELATED APPLICATION

This application is a national Phase entry under 35 USC 371 of International Patent Application No. PCT/AU2017/000082 filed on 4 Apr. 2017, which claims priority from Australian Application No. 2016901243 filed on 4 Apr. 2016 the disclosures of which are incorporated in their entirety by reference herein.

TECHNICAL FIELD

The present invention relates to containers blow moulded from injection moulded preforms and, more particularly, to such containers provided with an integral handle.

BACKGROUND

Blow moulded containers with integral handles are known and have been variously disclosed in various patents and applications held by the present applicant, including WO2007101309.

These documents described variously methods of manufacture and characteristics of the handles of these containers. It has however become apparent that there is some deficiency in the original formation of the handle profile and its configuration at the junction with the body of the preform and the resulting blown container, particularly at its attachment adjacent the neck of the container. It is in this region, particularly with larger capacity containers, that an uncomfortable degree of pressure can be brought to bear on the index finger as the container is lifted with the hand.

A further disadvantage of the handle described in the above referenced prior art lies in the relatively wasteful volume of material required to form the handle. Moreover, the webbed "I beam" structure of the handle is aesthetically inferior.

It is an object of the present invention to address or at least ameliorate some of the above disadvantages.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Accordingly, in a first broad form of the invention, there is provided a method of controlling a preform for stretch blow-moulding a container with an integrally formed handle; the preform comprising a body portion and the integrally formed handle; the preform transferred from a preform supply source to a blow moulding die for blowing the container; the method including the steps of passing the preform through a preform handle orientating apparatus, transferring the preform to a preform transportation system, maintaining orientation of the preform handle imposed by the perform handle orientating apparatus during transfer to the perform transportation system and transfer to the blow moulding die, rotating the preforms during transport along the transportation system past an array of preform heating elements while shielding the integrally formed handle from excessive exposure to the heating elements, transferring the preform from the transportation system to the blow moulding die, and wherein the handle comprises a loop of orientable material extending between an upper connection region and a lower connection region on the body portion of the preform; characterised in that the handle has a generally uniform cross section from proximate the lower connection region to a gradually widening cross section approaching the upper connection region; the cross section reaching and maintaining a maximum width proximate the upper connection region.

In yet a further broad form of the invention there is provided a method of controlling a preform for stretch blow-moulding a container with an integrally formed handle; the preform comprising a body portion and the integrally formed handle; the preform transferred from a perform supply source to a blow moulding die for blowing the container; the method including the steps of transferring the preform from a transportation system to the blow moulding die, and wherein the handle comprises a loop of orientable material extending between an upper connection region and as lower connection region on the body portion of the preform; characterised in that the handle has a generally uniform cross section from proximate the lower connection region to a gradually widening cross section approaching the upper connection region; the cross section reaching a maximum width proximate the upper connection region.

Preferably said method further includes said steps of:

passing the preform through a preform handle orientating apparatus, transferring the preform to a preform transportation system, maintaining orientation of the preform handle imposed by the perform handle orientating apparatus during transfer to the perform transportation system and transfer to the blow moulding die.

Preferably said method includes the step of:

rotating the preforms during transport along the transportation system past an array of preform heating elements while shielding the integrally formed handle from excessive exposure to the heating elements.

In a further broad form of the invention there is provided a handle of a stretch blow moulded container; the container blown from a preform including the handle as an integral loop of orientable material extending from an upper connection region to a lower connection region; the handle including a straight lower section and an arcuate section extending from an end of the straight lower section to the upper connection region; the handle having a generally uniform cross section from proximate the lower connection region to a gradually widening cross section approaching the upper connection region; the cross section reaching a maximum width proximate the upper connection region.

Preferably, the cross section of the handle extends from opposing outer edges towards a central line; the cross section increasing in thickness progressively from the outer edges to a maximum thickness at the central line.

Preferably, the handle includes a straight section angling downwardly from the lower connection region and an arcuate section extending from an end of the straight section to the upper connection region.

Preferably, integrally moulded first, second and third strengthening elements are provided respectively at each of the upper connection region and the lower connection region and at the junction between the straight section and the arcuate section.

Preferably, the first strengthening element at the upper connection region comprises a first curved element conforming generally in width and in cross section to the width and cross section of the handle proximate the upper connection region; the first curved element extending from a first separate connection region below the upper connection region to merge with the handle proximate to a first end of the maximum width of the handle.

Preferably, the second strengthening element at the lower connection region comprises a straight element conforming generally in width and cross section with the width and cross section of the straight section of the handle; the straight element extending from a second separate connection region above the lower connection region to a merge with the straight section of the handle proximate the lower connection region.

Preferably, the third strengthening element at the of the straight and arcuate sections of the handle comprises a further curved element conforming generally in width and cross section with the width and cross section of the handle adjacent the junction of the straight and arcuate sections of the handle; respective outer ends of the curved element merging with the straight and arcuate sections of the handle.

Preferably, each strengthening element includes a web of orientable material within boundaries formed respectively between the body of the preform and the first and second strengthening elements, and between the third strengthening element and the straight and arcuate sections; each web of orientable material aligned with and extending equally in both directions from the central line.

In another broad form of the invention, there is provided a method of reducing strain on a supporting finger of a hand lifting a blow-moulded container; the container provided with an integral handle; the method including:
stretch blow-moulding the container from a preform which includes an integral loop of orientable material forming the handle; the loop of orientable material extending between an upper connection region and a lower connection region,
forming the handle with an arcuate section extending from a lower section to the upper connection region,
widening a cross section profile of the arcuate section proximate the upper connection region to a maximum width of the handle,
providing a strengthening element proximate the upper connection region; the strengthening element comprises a first curved element conforming generally in width and in cross section to a width and cross section of the handle proximate the upper connection region; the first curved element extending from a first separate connection region below the upper connection region to merge with the handle proximate to a first end of a maximum width of the handle.

Preferably, curvature of the strengthening element is selected for fitting an average index finger of a human hand.

In yet another broad form of the invention, there is provided handle of a stretch blow moulded container; the container blown from a preform including the handle as an integral loop of orientable material extending from an upper connection region to a lower connection region; the handle including a straight lower section and an arcuate section extending from art end of the straight lower section to the upper connection region; the handle having a generally uniform cross section from proximate the lower connection region to a gradually widening cross section approaching the upper connection region; the cross section reaching and maintaining a maximum width proximate the upper connection region.

BRIEF DESCRIPTION OF DRAWINGS

Embodiments of the present invention will now be described with reference to the accompanying drawings wherein:

FIGS. 1, 1A and 1B are views of a container and preform according to prior art, FIG. 2 is a side view of a preferred embodiment of a preform and integrally attached handle according to the invention, FIG. 3 is an end view of the preform and handle of FIG. 1, FIG. 4 is a view from above of the preform and handle of FIGS. 1 and 2, FIGS. 5A to 5C show cross sections at various locations of the handle of FIGS. 2 to 4.

DESCRIPTION OF EMBODIMENTS

In this specification the term "integral connection" or "integrally connected" means a connection between the handle and the preform (and subsequently the corresponding connection on the container blown from the preform) which is made from the same material as the handle and the preform and is formed as an inherent part of an at the same time as the preform is formed.

Figure 6:
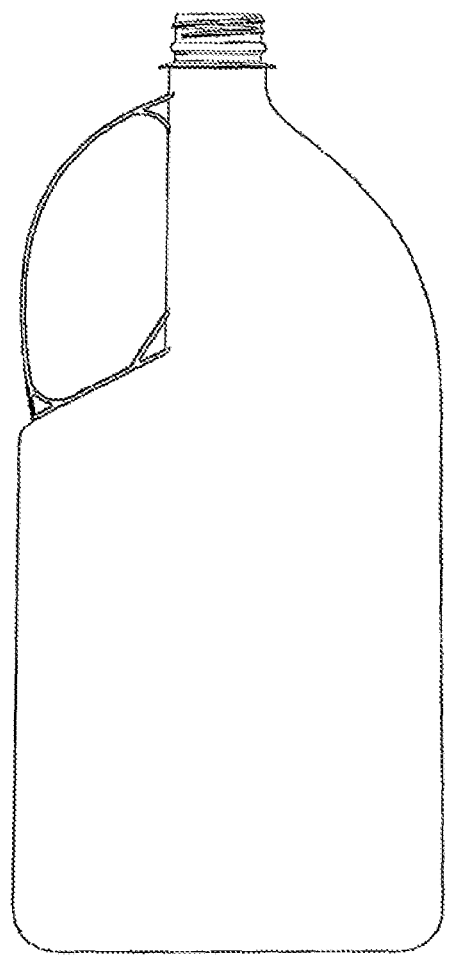
FIG. 6 is a side view of a container which may be stretch blow-moulded from the preform shown in FIGS. 2 to 4.

The preform and integrally attached handle of the present invention is for the production of a stretch blow-moulded container of oriented PET material which includes an integral handle, as shown in FIG. 6. There are basically two types of processes for stretch-blow moulding a container from polymer material: 1) a single-stage process in which preforms are made and containers blown on the same machine, and 2) a two-stage process in which preforms are made on one machine and blown into the container later, possibly at another remote location, on another machine.

Single-stage equipment is capable of processing PVC, PET, and PP. Once the preform or parison is formed (either extruded or injection moulded), it passes through conditioning stations which bring it to the proper orientation temperature. The single-stage system allows the process to proceed from raw material to finished product in one machine, but since tooling cannot be easily changed, the process is best suited for dedicated applications and low volumes.

With the two-stage process, processing parameters for both preform manufacturing and container blowing can be optimized. A processor does not have to make compromises for preform design and weight, production rates, and container quality as he does on single-stage equipment. He can either make or buy preforms. And if he chooses to make them, he can do so in one or more locations suitable to his market. Both high-output machines and low output machines are available. In the two stage process, preforms will be introduced into the stretch blow-moulding machine at ambient temperature and will require special pre-heating arrangements before preforms enter the blow-moulding die.

In this specification the term "integral connection" or "integrally connected" means a connection between the handle and the preform (and subsequently the corresponding connection on the container blown from the preform) which is made from the same material as the handle and the body of the preform and is formed as an inherent part of the injection moulded preform.

FIG. 1 shows a container according to prior art, stretch blow-moulded from a preform (FIG. 1A) which includes an integral handle. As can be seen in the end view of FIG. 1B, the handle forms a constant width profile throughout its length between the upper connection region and the lower connection region. Although the "I-beam" form of the handle profile provides strength, the relatively narrow area adjacent the upper connection region renders this form of handle uncomfortable, even painful to hold for any extended period, particularly for containers with large, for example 2 litre or greater volumes.

Turning now to FIG. 2, in a preferred form of the present invention, a preform 100 includes a neck 102, a body portion 103 and a handle 113. The neck 102 has a threaded portion 104 and a locating ring 105. The preform is injection moulded from PET material. It can be seen in FIG. 6, that in the present invention, the handle in its configuration as injection moulded in its preform state, remains unaltered by the stretch blow-moulding process forming the container of FIG. 6.

Figure 7:
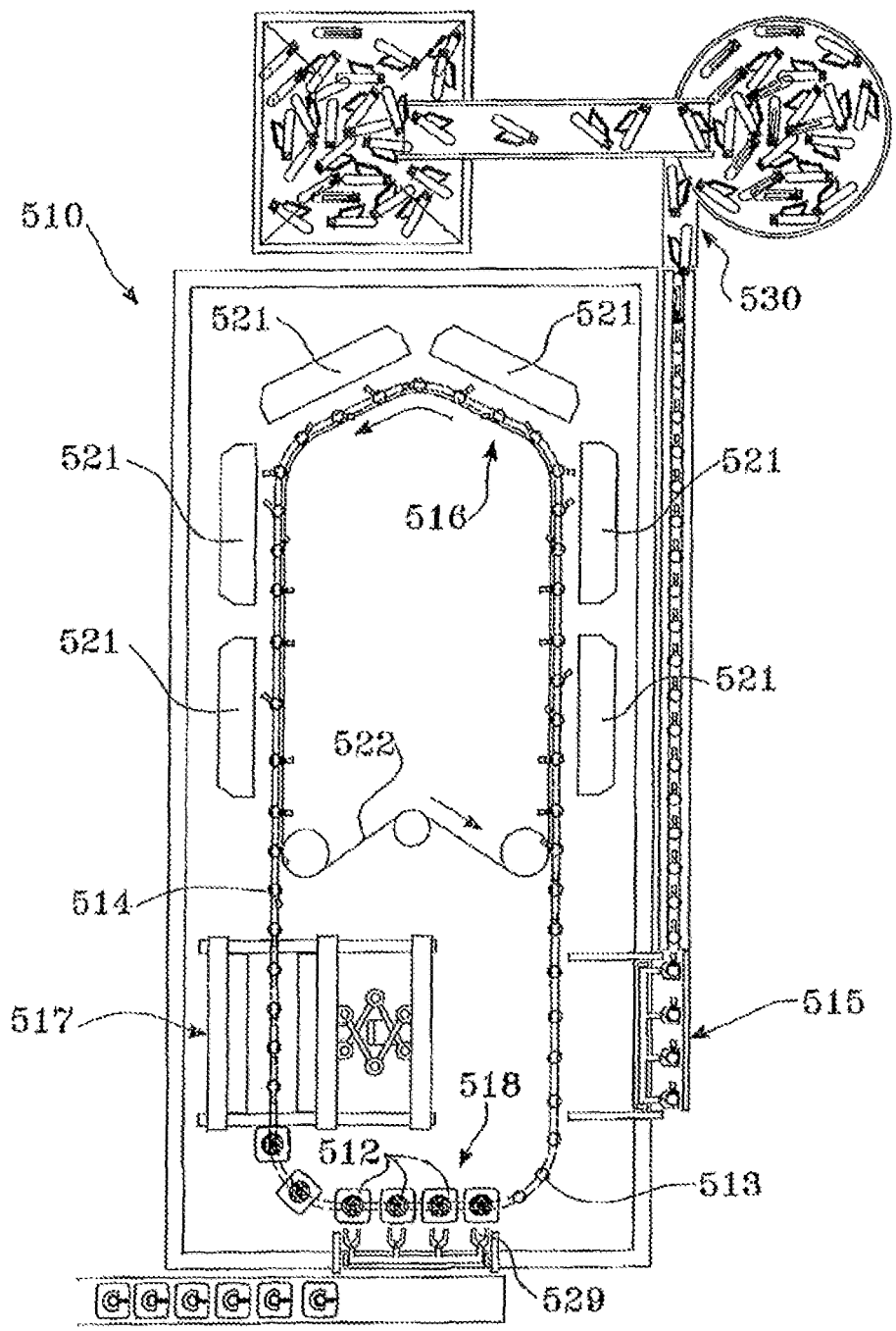
FIG. 7 is a plan view of a possible stretch blow-moulding machine suitable for the production of the container of FIG. 6 from the preform of FIGS. 2 and 3.
Figure 10:
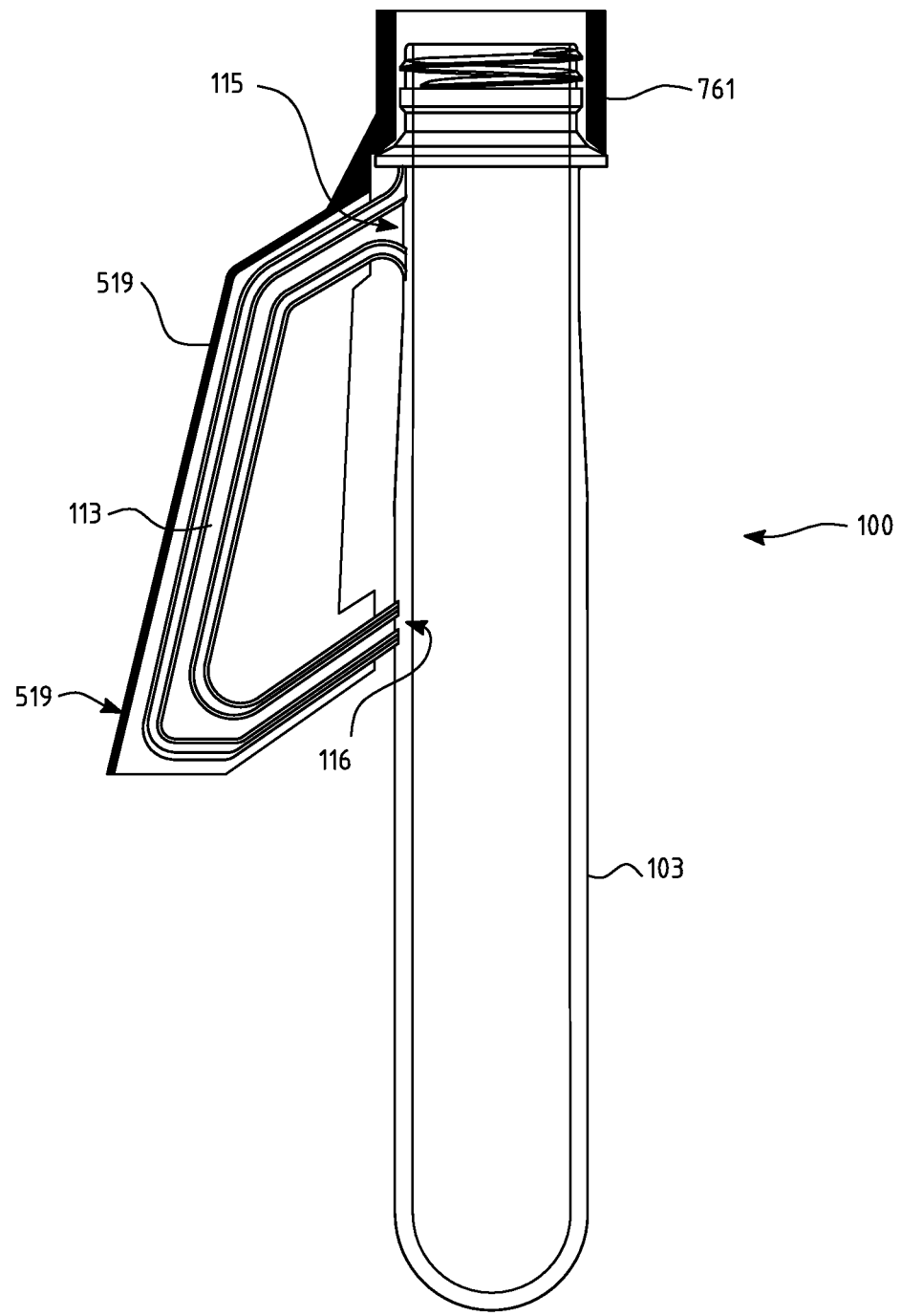
FIG. 10 is a partial cross section view of the integral handle of a preform nested in a heat shield.

In order to produce the container shown in FIG. 6, the preform 100 shown in FIGS. 2 to 4, according to an embodiment of the invention, is fed into a blow moulding machine such for example as the machine 510 shown schematically in FIG. 7, and blow moulded according to bi-axial orientation blow moulding techniques. During this process the neck 102 is held in a mandrel 513, as shown in FIGS. 8 and 10 of a transport system of the machine 510 in such a way as to prevent its expansion in the stretch blow-moulding die 517.

Initially, the expandable portion of the preform below the neck can be mechanically stretched downwardly to the bottom of the mould and then the bulk of the preform can be blown outwardly by application of compressed air as well known in the art.

In one preferred form, with reference to FIG. 7, a stretch blow moulding machine 510 includes a chain drive transport mechanism 516 which has at plurality of mandrels 513 mounted thereon at substantially equally spaced intervals, such that each mandrel follows a generally oval path through various processing stations on the machine 510.

Figure 8:
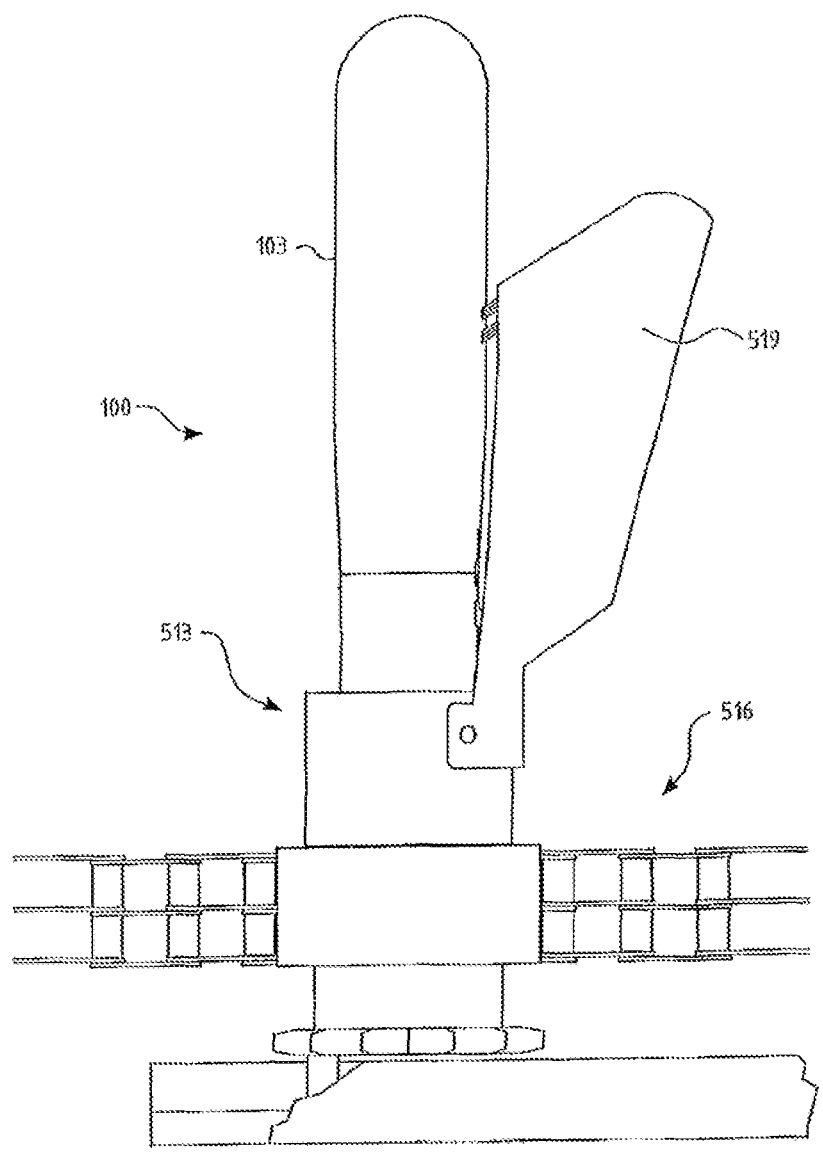
FIG. 8 is a side view of a preform in transit on a transport system of the machine of FIG. 7, FIGS. 9 and 9A illustrate a method of feeding and orienting a preform with integral handle for use in the machine of FIG. 7.

With reference to FIGS. 7 and 8, a preform 100 mounted on a mandrel 513, as shown in FIG. 8, proceeds from a loading station 515 of the machine 510 via a series of conditioning heaters 521 to a stretch blow moulding station 517 and thence to unloading station 518. A separate drive system 522 ensures that the preforms are rotated as they pass by the heaters 521 to ensure even heating of the preform body.

As illustrated in FIG. 8 each mandrel 513 includes a heat shield 519. Although this heat shield is for a different configuration of preform handle to that of the present invention, the process of mounting in a mandrel provided with a heat shield, the pre-heating of the preform and its progress through the stretch blow-moulding stage, are identical in principle to the processes applied to the preform and handle of the present invention.

The heat shield 519 is adapted to receive within it the integral handle 113 of preform 100 for the purpose of shielding handle 113 against heat imparted by the radiant heaters 521 as the preform is transported through the heating stage in the direction indicated by the arrow in FIG. 7.

It will be understood that the orientation of the handle must be controlled at the point where the preform is inserted into a mandrel prior to the entry of the preform into the heating stage to enable the heat protective shield 519 to be correctly fitted over the handle 113.

Figure 11:
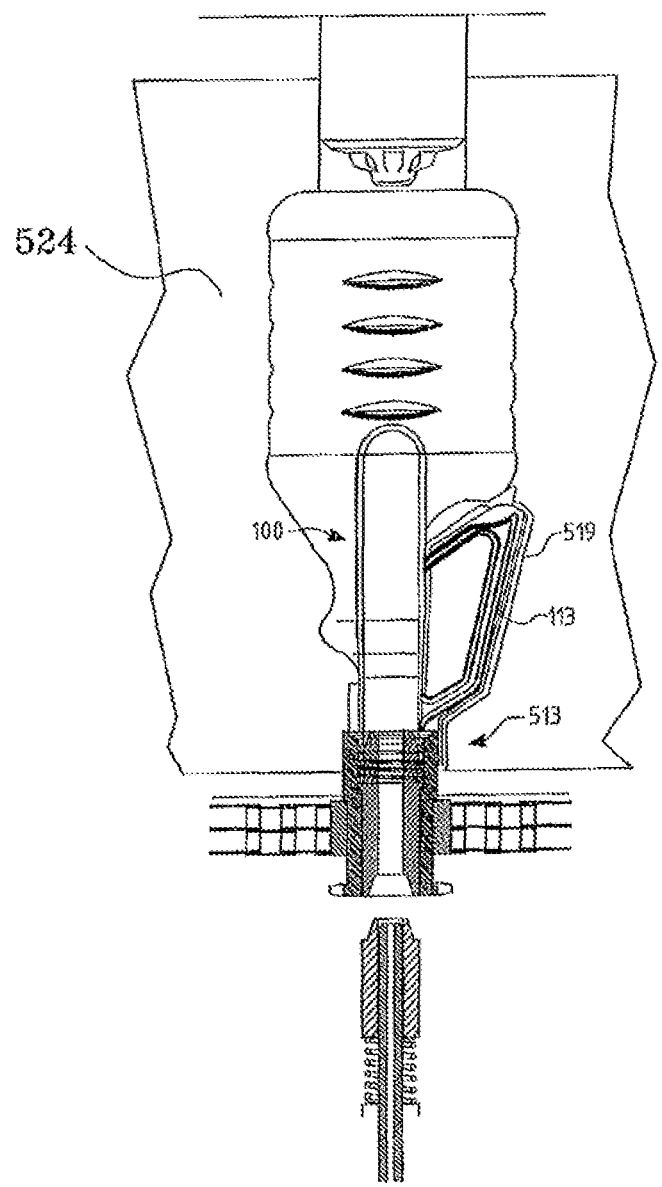
FIG. 11 is a view of a perform with integral handle entered into a stretch blow-moulding die for blowing info a container such as shown in FIGS. 1 and 6.

Furthermore, it is essential that each preform 100 is presented to the stretch blow-moulding tool 517 with the handle and heat shield correctly oriented so that the handle and heat shield are correctly enclosed in the halves of the mould when this closes for the blowing stage as shown in FIG. 11.

Figure 9:
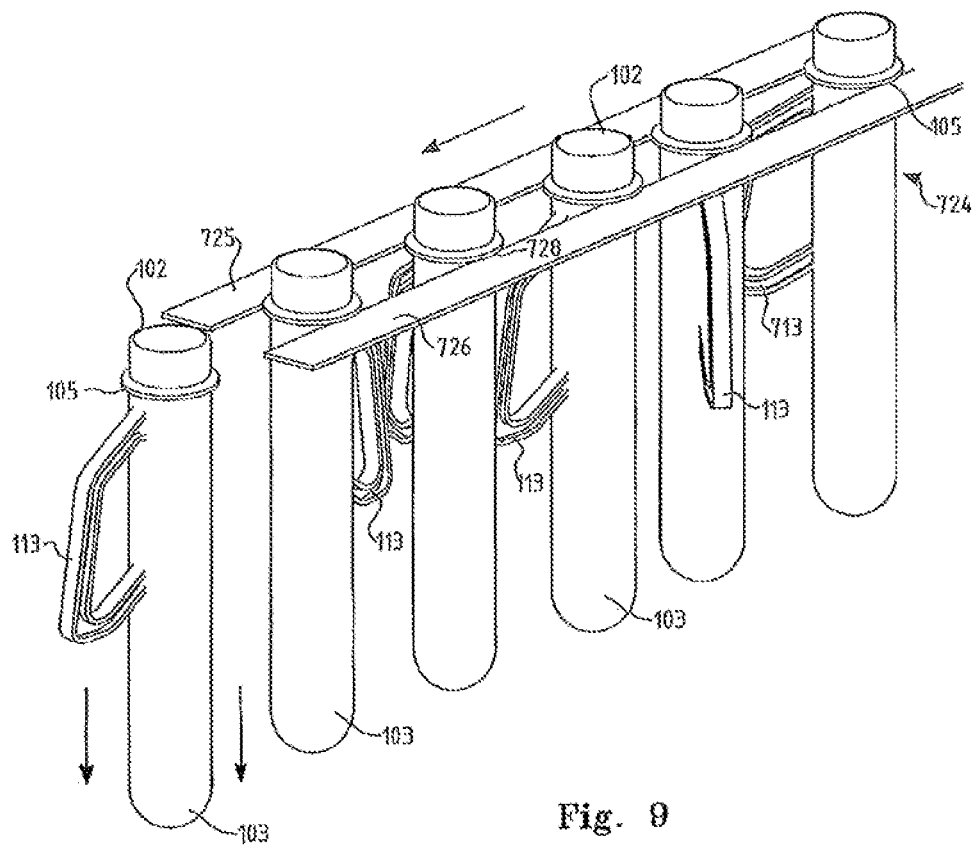
Figure 9A:
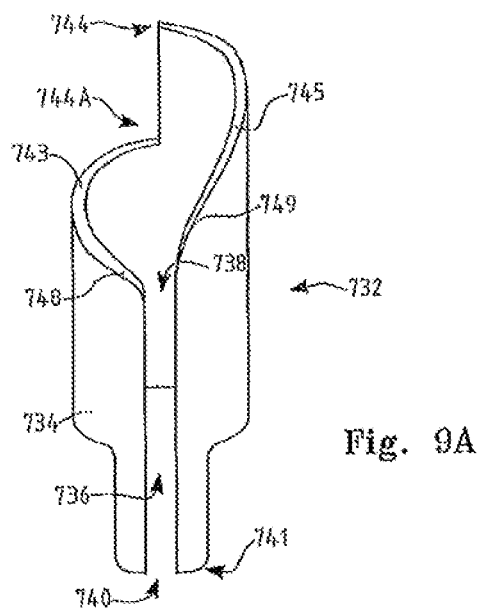

With reference to FIGS. 9 and 9A, in one preferred arrangement, preforms 100 are fed from a suitable supply source, (such as for example a hopper or a vibratory bowl as shown in FIG. 7) to an infeed rail 724 at a loading, station 530. Infeed rail 724 is arranged so that preforms 100 progress along rail 724, either by gravity, vibration or other linear transporting means, supported between parallel tail elements 725 and 726 at the underside of locating ring 105, as shown in FIG. 9.

The orientation of the handles 113 of the preforms during transport along infeed rail 724, is preferably controlled by a guiding channel (not shown) to loosely constrain the handles from assuming an orientation approaching, or at right angles to the direction of travel. Preforms 100 are thus constrained to proceed along infeed rail 724 either with the handle 113 pointing generally forward of the body 103 or trailing it. An escapement (not shown) at the end of infeed rail 724 provides for control of sequential discharge of individual preforms 100 from the end of the rail.

Preforms thus released from infeed rail 724, are allowed to drop vertically into an orienting apparatus 732 shown in FIG. 9A fixed directly below the escapement at the end of infeed rail 724. In a preferred form, the orienting apparatus 732 shown in FIG. 9A consists of a truncated cylindrical sleeve 734 which has an internal diameter adapted to allow free sliding passage of the cylindrical body 103 of the preform and locating ring 105. The wall of the sleeve 734 is provided with a slit 736 extending the length of the sleeve 734 from a handle inlet opening 738 at the upper edge 749 of the sleeve 734, to a handle outlet opening 740 at the lower edge 741. The slit is of sufficient width to allow sliding passage of the handle 113 of a preform 100.

The upper edges 745 and 743 of sleeve 734 are formed to guide a handle 113 into the slit 736. For this purpose the upper edges 745 and 743 are formed to slope steeply from respective high points 744 and 744A diametrically opposite the handle inlet, down to the handle inlet opening 738 of slit 736. To ensure that the handle does not fall onto and become lodged on the highest points on upper edges 743 and 745, the infeed rail 724 is arranged approximately at right angles to the radial position of slit 736. Thus handles 113 which, as described above are prevented from assuming this orientation while conducted along the infeed rail 724, cannot contact the upper edges 743 and 745 at the highest points, but will rather drop onto the orienting device with the handle contacting either sloping upper edge 743 or 745.

Sloping edges 743 and 745 slope down to respective sides of the slit 736, from the highest points 744 and 744A, ending in respective smoothly rounded corners 748 and 749 at the handle inlet opening 738. The slope is sufficient to ensure that the handle 113 of the preform 100 slides along the sloping edge sections.

A preform 100 falling into the apparatus 732 with a handle 113 not aligned with slit 736 will, as the handle makes contact with either sloping section 743 or 745, be rotated as it slides down under its own weight, until handle 113 is aligned with slit 736 and the preform 712 falls cleanly through the apparatus.

Arranged immediately below apparatus 732 is a rotary indexing table (not shown) provided around its periphery with a number of equally spaced nests, so situated that each successive nest comes to an aligned position with the axis of apparatus 732 at each indexing of the indexing table. Nests are adapted to receive a preform 100 and retain it in such a way that the orientation of the handle 113 initially imposed by apparatus 732 is maintained relative to each nest for the duration of the preform's retention in the nest.

When, with the indexing of the table, a preform 100 reaches a transfer station 515 (see FIG. 7), the preform is ejected upwardly out of the nest in which it was supported, to engage with one of a series of mandrels 513 of the preform transport system 516, operating between the loading station 515 and the blow-moulding tool 517. A preferred mandrel arrangement with a preform attached is shown in FIG. 10.

When inserted into the mandrel 513, the open neck 102 of the preform 100 is pushed over a resilient plug 759 located in a cylindrical socket 761 at the base of the mandrel. The plug 759 enters the open neck as an interference fit sufficient for the weight of the preform 100 to be supported within the socket 761. The socket also acts to shield the neck 102 from excessive heat during the heating stage.

The body portion 103 of preforms 100 must be heated to the required degree of plasticity so that the material in the body portion 100 of the preform can be bi-axially oriented in the stretch-blow-moulding process. However, neither the neck portion 102 nor the handle 113, should be subjected to bi-axial stretch blow moulding and must be shielded from excessive heat during the heating stage to prevent their crystallization with consequent loss of strength. Thus for transport through the heating stage, the handle 113 of the preform 100 is protected by the heat shield 519, and the neck portion 102 by the cylindrical socket 761 of the mandrel 513, as shown in FIG. 10.

As the preforms 100 are transported past the heating station 521 they are rotated on the mandrels 513 by a drive mechanism 522 to provide even heating to the body portion of the preform while the heat shield 519 protects the handle from excessive heating.

Rotation of the mandrels is arranged so that at the point of entry into the stretch blow moulding die, the heat shield and the handle are correctly oriented with the die cavity as shown in FIG. 11. After the container is blown, the transport system draws the mandrel and container from the die and the container is ejected from the mandrel.

Turning now to the specific characteristics of the handle 113 according to the present invention, the handle is injection moulded integrally with the body portion of the preform, and comprises a loop or orientable material extending between an upper connection region 115 and a lower connection region 116 on the body portion 103 of the preform. It can be described as consisting of two main sections: a lower straight section 118 angling downwardly from the lower connection region 116 and an arcuate section 120 extending from an end 121 of the straight section 118 to the upper connection region 115.

Figure 5A:
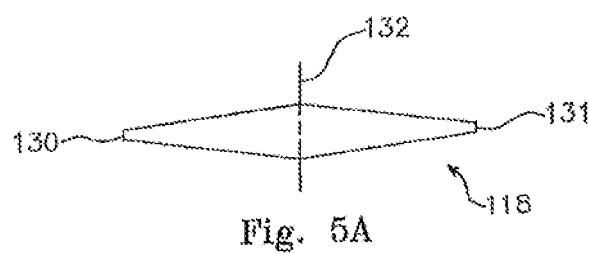
Figure 5B:
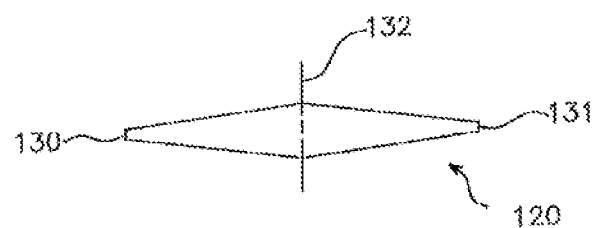
Figure 5C:
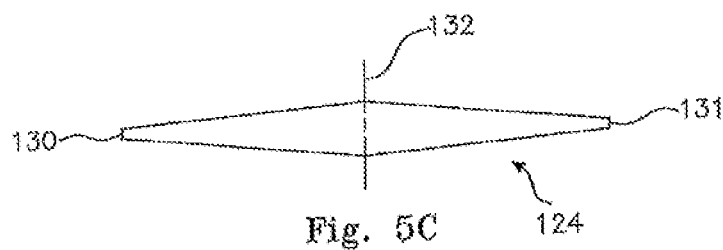

The loop of orientable material forming the handle 113 has a generally uniform cross section from proximate the lower connection region 116 to a gradually widening cross section 124 approaching the upper connection region 115 with the cross section reaching and maintaining a maximum width proximate the upper connection region 115 as can be seen in FIGS. 3 and 4. FIGS. 5A to 5C show the cross sections at typical regions of the handle 113. FIG. 5A at the straight section 118, FIG. 5B for the greater length of the arcuate section 120, and FIG. 5C for the wider cross section proximate the upper connection region 115.

As can be seen from FIGS. 5A to 5C, the cross section in each region of the loop or orientable material forming the handle 113, extends from opposing outer edges 130 and 131 towards a central line 132; the cross section increasing in thickness progressively from the outer edges 130 and 131 to a maximum thickness at the central line 132.

With reference again to FIG. 2, integrally moulded first, second and third strengthening elements 135, 136 and 137 are provided respectively at each of the upper connection region 115, the lower connection region 116 and at the junction between the straight section 118 and the arcuate section 120 of the handle 113.

The first strengthening element 135 at the upper connection region 115 comprises a curved strengthening element conforming generally in width and in cross section to the width and cross section of the widened portion 124 of the handle proximate the upper connection region as shown in FIG. 5C. The curved strengthening element extends from a first separate connection region 140 on the body portion 103 of the preform (and on the blown container) below the upper connection region 115 and merges with the loop of orientable material proximate a first end 141 of the maximum width of the handle.

The second strengthening element 136 at the lower connection region 116 of the handle, comprises a straight strengthening element conforming generally in width and cross section with the width and cross section of the straight section 118. The straight strengthening element extends from a second separate connection region 142 above the lower connection region 116 of the straight section of the handle, to merge with the straight section of the handle proximate the lower connection region.

The third strengthening element 137 at the junction of the straight section 118 and the arcuate section 120 of the handle, comprises a further curved strengthening element conforming generally in width and cross section with the width and cross section of the handle of both the straight section 118 and the arcuate section 120 adjacent the junction. Respective outer ends of this further curved element merge with each of the straight 118 and arcuate 120 sections.

It should be noted that the width of the first strengthening element 135 is the same as that of the maximum width of the widened part 124 of the handle proximate the upper connection region 115. It is this increased width of the first strengthening element 135 which provides for a larger area for distributing the load of a container over the index finger of a hand (not shown) lifting the container shown in FIG. 6, while the curvature of the first strengthening element is selected to fit comfortably on the average index finger of a human hand.

Preferably, though not essentially, each strengthening element 135, 136 and 137 includes a web of orientable material within boundaries formed respectively between the body portion 112 of the preform and the first and second strengthening elements 135 and 136, and between the third strengthening element 137 and the straight and arcuate sections 118 and 120. Each web of orientable material is aligned with and extends equally in both directions from the central line 132 of handle.

In an alternative form of production equipment rotatable moulds may be provided on a turret arrangement for reception of the preforms preparatory to blowing within the moulds.

The invention claimed is:

1. A method of reducing strain on a supporting finger of a hand lifting a blow-moulded container; the container provided with an integral handle; the method including:
   stretch blow-moulding the container from a preform which includes an integral loop of orientable material forming the handle; the loop of orientable material extending between an upper connection region and a lower connection region,
   forming the handle with an arcuate section extending from a lower section to the upper connection region,
   widening a cross section profile of the arcuate section proximate the upper connection region to a maximum width of the handle,
   providing a strengthening element proximate the upper connection region; the strengthening element comprises a first curved element conforming generally in width and in cross section to a width and cross section of the handle proximate the upper connection region; the first curved element extending from a first separate connection region below the upper connection region to merge with the handle proximate to a first end of a maximum width of the handle.

2. The method of claim 1, wherein curvature of the strengthening element is selected for fitting an average index finger of a human hand.

3. The method of claim 1, wherein the cross section of the handle extends from opposing outer edges towards a central line; the cross section increasing in thickness progressively from the outer edges to a maximum thickness at the central line.

4. The method of claim 1, wherein the handle includes a straight section angling downwardly from the lower connection region and an arcuate section extending from an end of the straight section to the upper connection region.

5. The method of claim 4, wherein integrally moulded first, second and third strengthening elements are provided respectively at each of the upper connection region and the lower connection region and at the junction between the straight section and the arcuate section.

6. The method of claim 5, wherein the first strengthening element at the upper connection region comprises a first curved element conforming generally in width and in cross section to the width and cross section of the handle proximate the upper connection region; the first curved element extending from a first separate connection region below the upper connection region to merge with the handle proximate to a first end of the maximum width of the handle.

7. The method of claim 5, wherein the second strengthening element at the lower connection region comprises a straight element conforming generally in width and cross section with the width and cross section of the straight section of the handle; the straight element extending from a second separate connection region above the lower connection region to a merge with the straight section of the handle proximate the lower connection region.

8. The method of claim 5, wherein the third strengthening element at the junction of the straight and arcuate sections of the handle comprises a further curved element conforming generally in width and cross section with the width and cross section of the handle adjacent the junction of the straight and arcuate sections of the handle; respective outer ends of the curved element merging with the straight and arcuate sections of the handle.

9. The method of claim 5, wherein each strengthening element includes a web of orientable material within boundaries formed respectively between the body of the preform and the first and second strengthening elements, and between the third strengthening element and the straight and arcuate sections; each web of orientable material aligned with and extending equally in both directions from the central line.

* * * * *